United States Patent [19]
Roberts et al.

[11] Patent Number: 5,193,437
[45] Date of Patent: Mar. 16, 1993

[54] BEVERAGE MAKING APPARATUS HAVING IMPROVED SERVICEABILITY

[75] Inventors: Melvin F. Roberts, Niles; Raymond Blecharz, Berwyn, both of Ill.

[73] Assignee: Specialty Equipment Companies, Inc., Chicago, Ill.

[21] Appl. No.: 783,379

[22] Filed: Oct. 28, 1991

[51] Int. Cl.⁵ .............................................. A47J 31/44
[52] U.S. Cl. ............................. 99/280; 99/295
[58] Field of Search ................. 99/279, 280, 281, 282, 99/283, 284, 295, 300, 302 R, 304, 305

[56] References Cited

U.S. PATENT DOCUMENTS

4,503,757  3/1985  Daugherty ............................. 99/295
4,867,048  9/1989  Brewer ................................... 99/283
4,892,031  1/1990  Webster .................................. 99/295
4,969,392  11/1990  Steele .................................... 99/282

Primary Examiner—Robert W. Jenkins
Attorney, Agent, or Firm—Myers & Associates

[57] ABSTRACT

A beverage making apparatus having an upper housing and a lower housing for heating cold water for making a beverage, such as coffee. The upper housing forms an upper compartment for providing ready access to the components of the water system and the electric circuit through a top access opening. The operative components of the water system and the electric circuit are mounted for the ease of removal for service and replacement of parts.

15 Claims, 6 Drawing Sheets

BEVERAGE MAKING APPARATUS HAVING IMPROVED SERVICEABILITY

BACKGROUND OF THE INVENTION

2. Field of the Invention

This invention relates in general to beverage making apparatus and, more particularly, to a beverage making apparatus having improved serviceability.

2. Description of the Prior Art

Beverage brewers for coffee, tea and the like are conventionally equipped with electrical and water systems comprising a number of components to supply heat and deliver a brewed beverage or hot water to an external decanter and the like. The electrical system of such brewers include circuitry to operate, among many functions, the internal water heater coils and external warmers, the solenoid valves for controlling the delivery of water, indicator lights, and timers as is well known. The water system of a coffee maker receives water from a source for delivery to a reservoir tank in conjunction with the solenoid valve and other water control elements. In the past the electrical components and the elements of the water system have been mounted within the housing of the beverage brewer at locations that provide inconvenient access when service is needed. For example, the solenoid valves and timers of prior art coffee brewers are typically mounted in the lower portion of the equipment and are difficult to reach by service personnel. Moreover, such components of the electrical and water system of know brewers have been physically attached in a manner that deters quick removal and attachment. An example of a coffee brewer capable of providing effective coffee brewing is disclosed in U.S. Pat. No. 4,603,621 issued on Aug. 5, 1986 to Melvin F. Roberts. The foregoing coffee brewer disclosed in U.S. Pat. No. 4,603,621 and other commercially available systems, however, include an arrangement of internal parts that do not offer optimum accessibility or ease of part removal and attachment as desirable in the industry. The internal mounting techniques of the brewer components of known equipment require relatively burdensome and time consuming procedures to remove most components needing repair. Accordingly, it is desirable to provide a coffee brewer having improved serviceability for convenience and a reduction of labor time.

SUMMARY OF THE INVENTION

It is an objective of the present invention to provide an efficient beverage brewing system having enhanced serviceability for ease of repair, maintenance, and replacement of parts. The essential water and electrical components of the brewer herein disclosed are situated in an upper compartment at a position to be handy from the top of the housing for quick and convenient servicing.

Major operative components of the water and electrical system of the invention are in effect modularized through improved mounting to permit quick removal and replacement. Quick disconnect connectors are utilized throughout the electrical circuit to facilitate such ease of removal of operative components. By placing a majority of the system parts of the brewer herein disclosed in an upper, readily accessible compartment in a condition which allows for ease of removal, the brewer of the invention significantly reduce the cost and difficulty of servicing brewers for maintenance or repair.

DESCRIPTION OF THE PREFERRED EMBODIMENT

Figure 1:
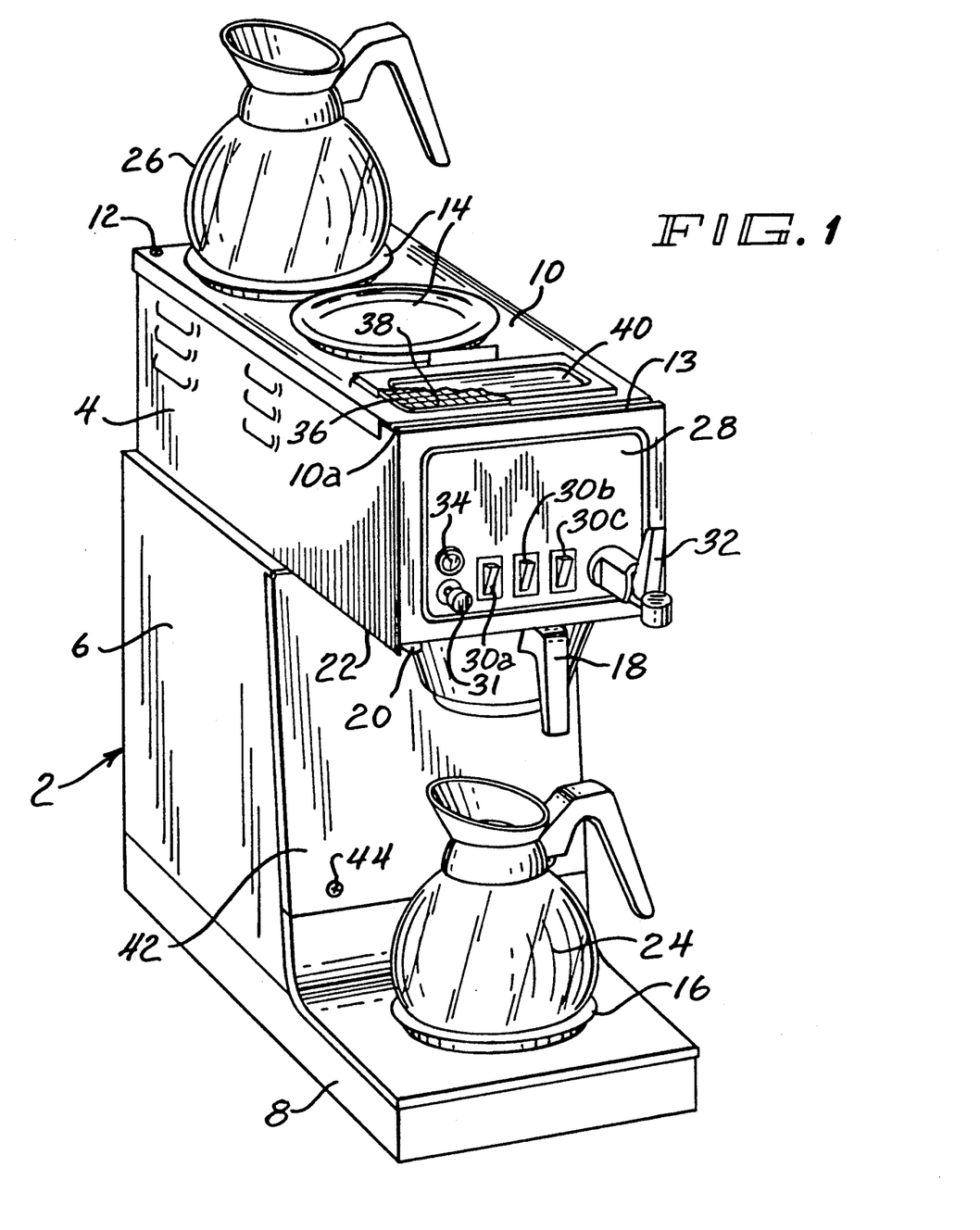
FIG. 1 is a front perspective of the beverage making apparatus of the invention.

Referring now to FIG. 1 there is illustrated a perspective view of the beverage making apparatus of the invention, generally designated by reference numeral 2. In the following description the beverage making apparatus 2 will be referred to as a coffee brewer, but it should be understood that the teachings of the invention may be used in brewing systems for other beverages. The coffee brewer 2 includes an upper housing 4 and a lower housing 6 affixed to a base 8. The upper housing 4 is enclosed at its top by a removable upper access cover plate 10 affixed to upper housing 4 by a pair of threaded screws 12 (one of which is shown in FIG. 1) that are located adjacent the rear corners. The front edge 10a of access cover 10 includes an offset lower edge portion which engages the underside of horizontal edge portion 13 of upper housing 4. The access cover 10 then can be detached by removal of the two screws 12.

A pair of decanter warmers 14 of conventional design are shown mounted on access cover 10 and are provided with internal heating elements (not shown). The base 8 supports a lower warmer 16 having an internal electrical heater and situated beneath a brewing chamber 18. The brewing chamber 18 is detachably retained by a pair of parallel tracks 20 (one shown in FIG. 1) on the bottom of a projecting portion 22 of upper housing 4. As illustrated in FIG. 1, decanter 24 may be positioned on warmer 16 and collect brewed coffee or other liquid that is brewed and discharged from brewing chamber 18. The upper warmers 14 may be used as backup warming stations for one or more additional decanters 26 of brewed coffee and the like.

Still referring to FIG. 1, the front panel 28 of upper housing 4 includes a plurality of on/off exterior switches 30a, 30b, and 30c respectively for controlling operation of the respective warmers 14 and 16. A depressible start button 31 for commencing an automatic brewing sequence is further carried on front panel 28. In addition, an external hot water spigot 32 and ready light 34 is provided on front panel 28. An inlet opening 36 fitted with a metal screen 38 is formed in the access cover 10 for receiving water from above. The inlet opening 36 is selectively covered by a hinged cover plate 40, a portion of which is shown in FIG. 1. A removable front access panel 42 is also mounted by threaded members 44 to the front of lower housing 6.

Figure 2:
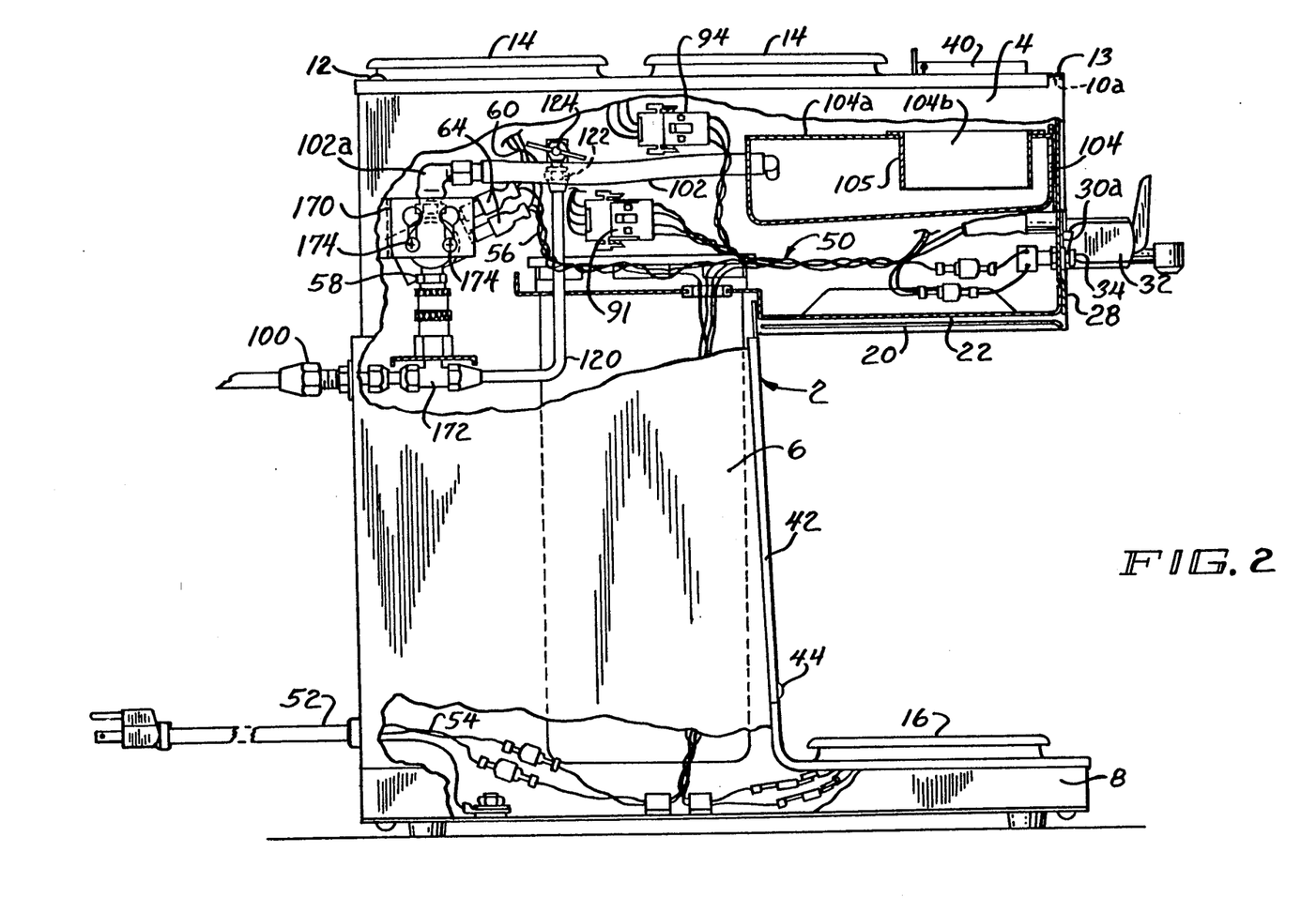
FIG. 2 is a side elevational view, with parts in section and cutaway, of the beverage making apparatus of FIG. 1.

In FIGS. 2 to 6a the operative components of coffee brewer 2 are shown. Although the overall electrical circuitry of coffee brewer 2 functions in the same manner as conventional brewing systems, such as found in the wiring system of Model Nos. 8714 and 8715 made by Bloomfield Industries, Chicago, Illinois, to control brewing operation and the warmer elements, it should be understood that the arrangement, mountings and connections of the electrical component are unique to the invention herein disclosed as will be apparent ±rom the following description. The electrical circuitry of coffee brewer 2 is generally designated by reference numeral 50 and is coupled to an electrical power source by conventional external power cord 52 as best seen in FIG. 2. The wiring of electrical circuit 50 is fabricated into a harness design for ease of removal. Electrical leads 54 extend through lower housing 6 from power cord 52 and provide electrical power to electrical circuitry 50, the majority of which is contained in upper housing 4. The power leads 54 include quick disconnect connectors 54a to permit separation of the wiring 54 from their connection to electric cord to repair any electrical defect. The only other wiring in the lower housing 6 and base 8 are electrical leads 55 to supply current to lower coffee warmer 14 as activated by one of the on/off switches 30a, b, and c.

Figure 4:
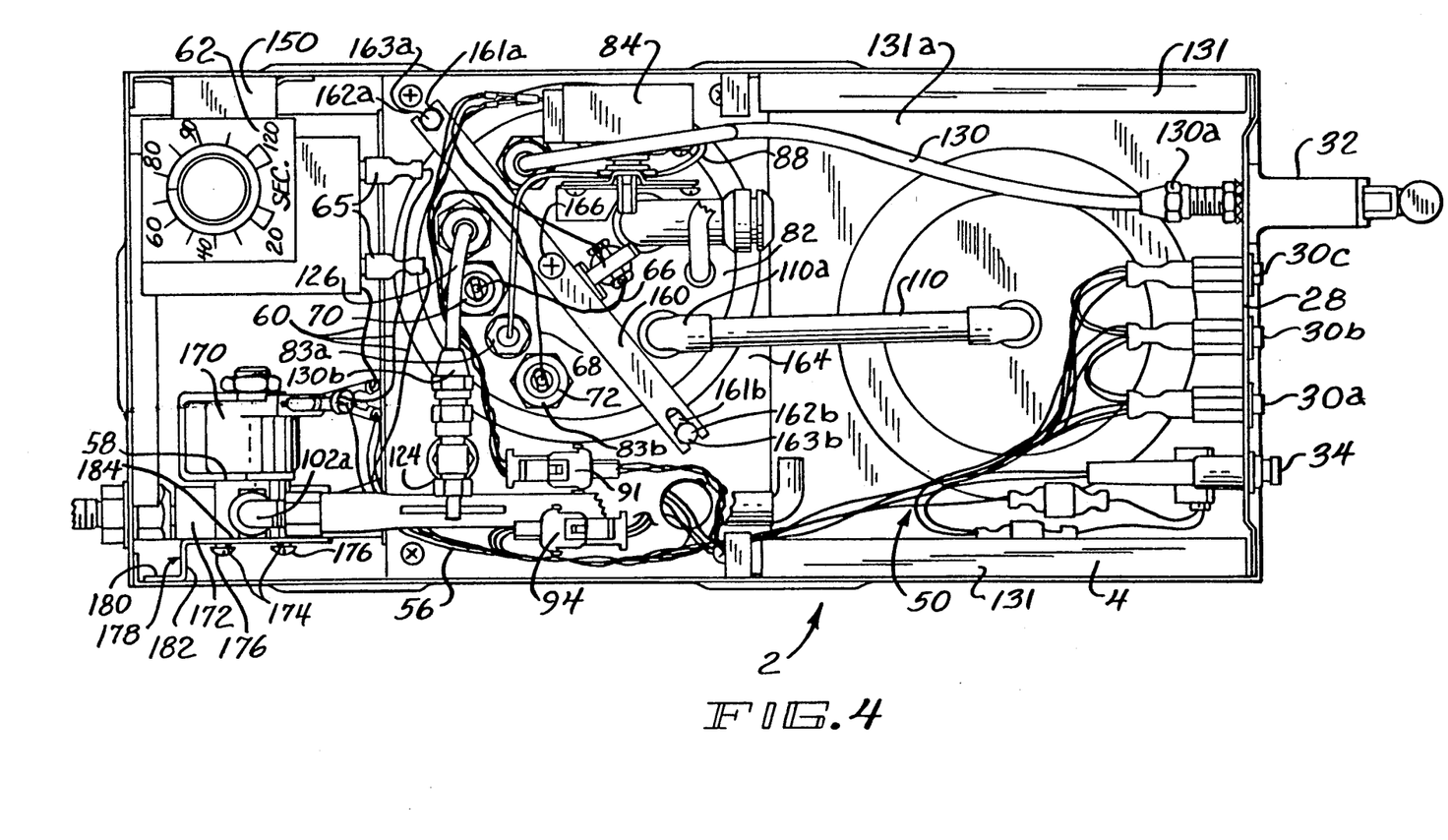
FIG. 4 is a top plan view, with the cover removed, of the beverage making apparatus of FIG. 1.
Figure 6:
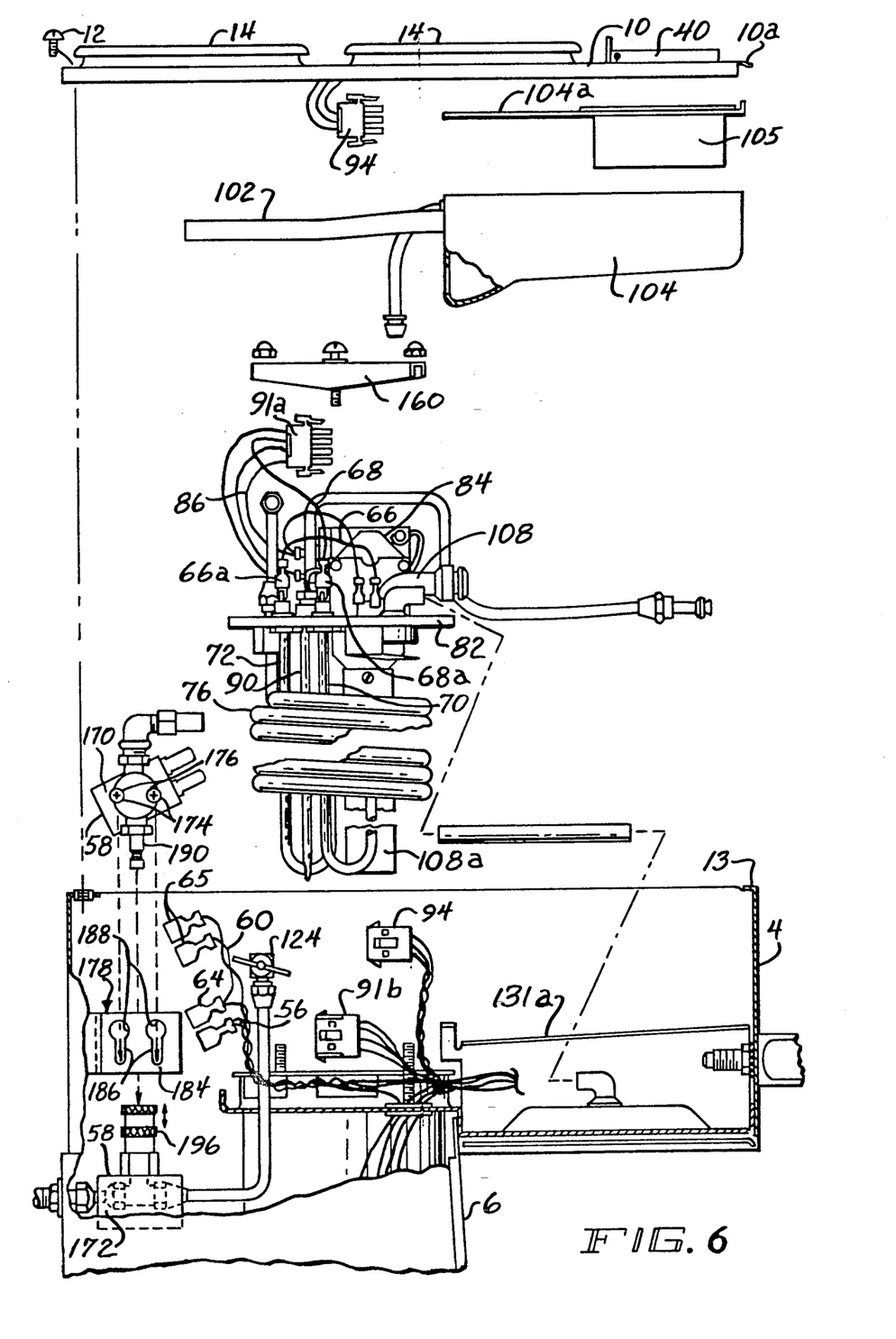
FIG. 6 is a partial enlarged elevational view, with parts removed and exploded, of the top portion of the beverage making apparatus of FIG. 1.

The electrical circuit 50 further includes leads 56 for providing power to solenoid water inlet valve 58 of the water flow system to be described later. The solenoid water inlet valve 58 is electrically connected by electrical leads 60 to a timer 62 of conventional design as illustrated in FIG. 4. The leads 56 and 60 are connected to the solenoid valve water inlet valve 58 by known quick disconnect connectors 64, that are easily separated as shown in FIGS. 2 and 6. Similarly, quick disconnect connectors 65 allow electrical disconnection of timer 62. Wiring 66 and 68 of electrical circuit 50 provide additional electrical potential of selected voltages to heating elements 70 and 72 of a looped configuration having a conventional design. As seen in FIG. 6, the heating elements 70 and 72 are connected to leads 66 and 68 by quick disconnect connectors 66a and 68b and are positioned within heater tank 74 in close relationship with hot water coil 76 of the water system. The heater elements 70 and 72 and hot water coil 76 are unitized by their mounting on the removable cover 82 of tank 74 as illustrated in FIGS. 4 and 6. The heater elements 70 and 72 are affixed to the tank cover 82 by lock nuts 83a and 83b in a known manner.

Figures 3, 6A:
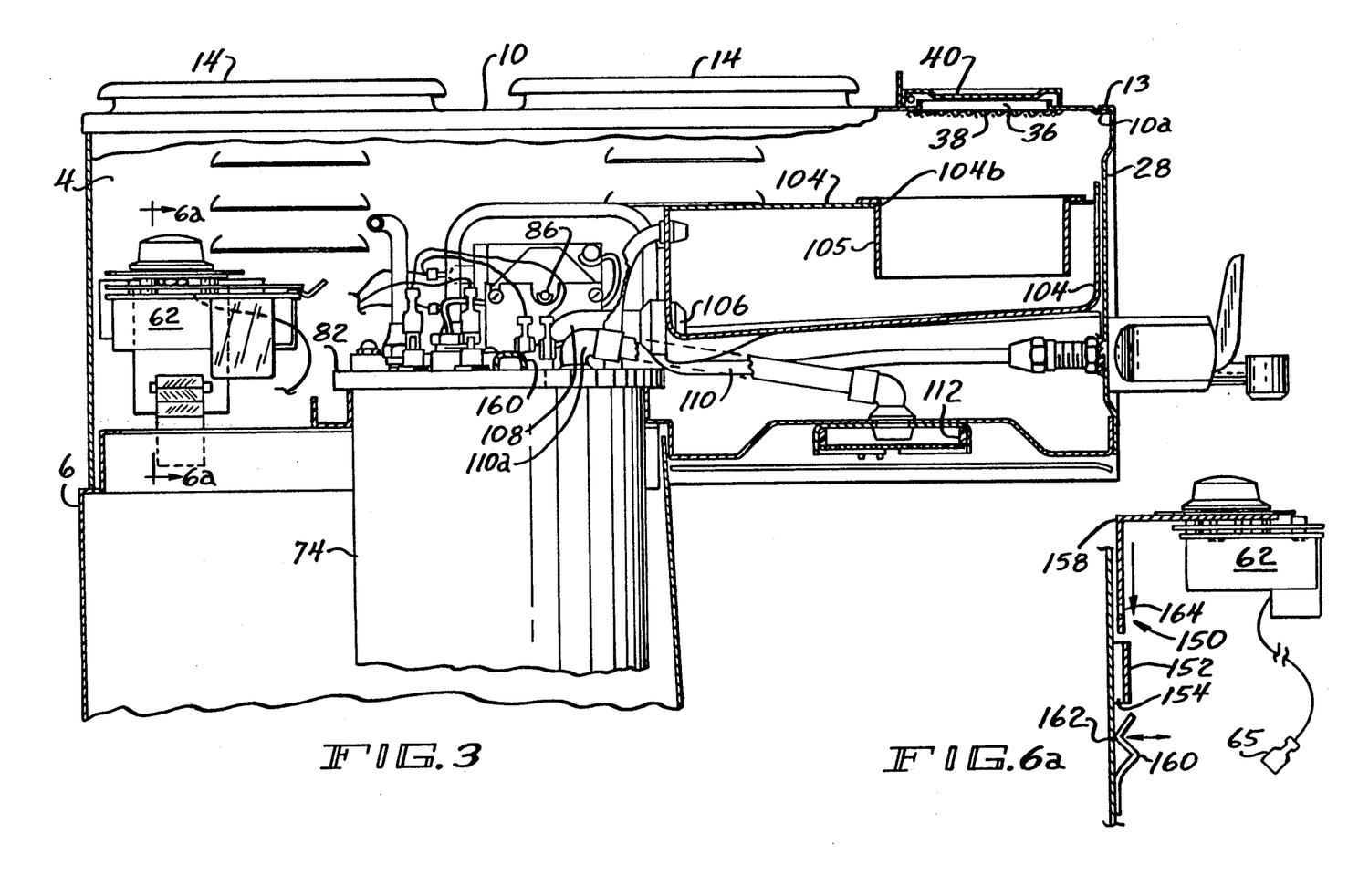
FIG. 3 is a partial enlarged elevational view, with parts in section, of the beverage making apparatus of FIG. 1.
FIG. 6a is a partial side elevational view, with parts in section, showing the mounting of the timer of the beverage making apparatus of FIG. 1.

As seen in FIGS. 3, 4, and 6, a thermostat 84 is further mounted on the top of tank cover 82 and is respectively coupled to electrical circuit 50 by leads 86 and to heater leads 66 and 68. The thermostat 84 controls the heating of water in tank 74 in a conventional manner by sensing water temperature through capillary tube 88 and a temperature sensor element 90 extending downward in tank 74. The thermostat 74 acts to control the electrical current to heaters 70, 72 in a manner to maintain a predetermined temperature of the water in tank 72 in a known technique. As seen in FIG. 6 the tank cover 84 with hot water coil 76, heating elements 70, 72, thermostat 84, and temperature sensor 90 are removable from tank 74 in a manner to be described. To facilitate separation of the foregoing components from the electric circuit 50, a separable multi-pin mate and lock connector 91 is employed as seen in FIG. 2. The connector 91 in separated form is shown as pin and socket sections 91a, 91b, in FIG. 6. Electrical leads 92 further connect the upper warmers 14 to electrical circuit 50 and also are provided with a multi-pin connection 94 for convenient disconnections when top access cover 10 is removed for service of the coffee brewer 2. The on/off switches 30a, 30b and 30c are operatively connected in electrical circuit 50 in a known manner to respectively activate warmers 14 and 16. The automatic brewing switch button 31 is electrically connected in the water flow system to timer 62 to activate the solenoid water inlet valve 58 in a manner to be described. The switches 30a, 30b, and 30c are all mounted on front panel 28 for quick disconnect for easy service.

Figure 5:
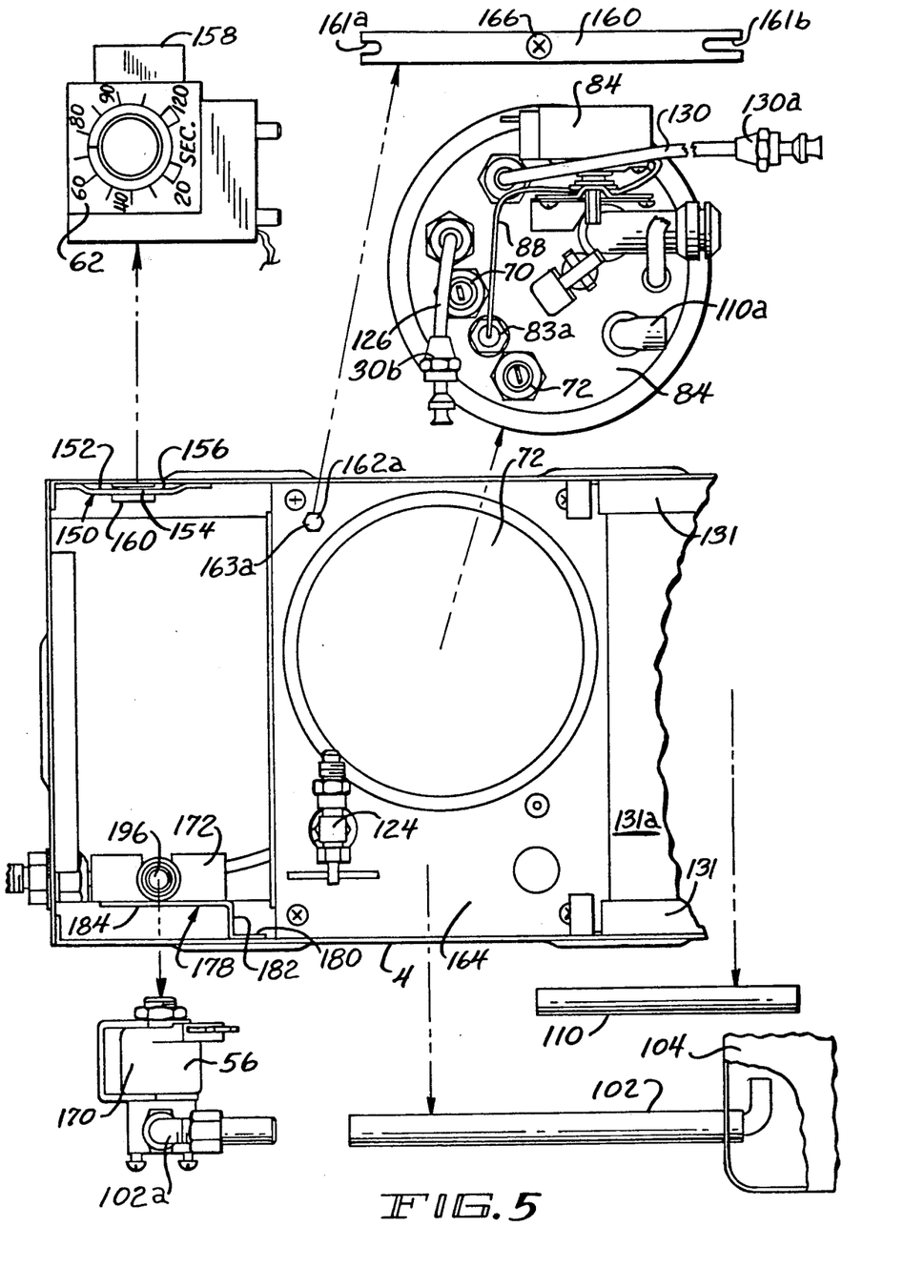
FIG. 5 is a partial enlarged top plan view, with parts exploded, of the beverage making apparatus of FIG. 1.

The water flow system for providing water to the tank 74 is best understood with reference to FIGS. 2, 3, and 4. An inlet pipe assembly 100 is arranged at an upper location on lower housing 6 and is connected to a water supply line (not shown). The inlet pipe 100 is in fluid communication with solenoid water inlet valve 58 which is operated by conventional timer 62 when the brew control switch 31 is depressed. The timer 62 is calibrated to open the solenoid water inlet valve 58 for a period of time sufficient to fill the coffee decanter 24. The solenoid water inlet valve 58 is provided with an internal flow element (not shown) which establishes a predetermined flow rate of water through an inlet water pipe 102 from an elbow 102a. The water inlet pipe 102 directs incoming cold water over into a water basin 104 removably disposed within upper housing 4. A splash cover 104a having an aperture 104b covers the basin 104 and a rectangular tube 105 in alignment with opening 36 is carried on cover 104a. As seen in FIG. 3, the basin 104 is formed to have a drain sump 106 for draining water into drain tube 108. Drain tube 108 includes an extension tube 108a that extends downward into the tank 74 near its bottom (FIG. 6) and directs the water through tank cover 82 into the bottom of tank 74. The entering cold water displaces an equal volume of hot water already heated near the top of tank 74 which flows into a siphon tube 110 (FIG. 3). The siphon tube 110 slopes downwardly from an elbow connection 110a attached to the top of tank 74 and discharges hot water into a spray disk assembly 112 which distributes the hot water over the coffee grounds in the brewing chamber 18. It should be further apparent that a predetermined volume of cold water can also be poured through upper inlet 36 for delivery through drain sump 106 to the bottom of tank 74 for directing hot water into brewing chamber 18. Following the time sequence the solenoid water inlet valve 58 is closed and the heated water within the brewing chamber seeps down by gravity into decanter 24. The timing sequence established by the timer 62 is selected to insure that the decanter 24 is filled to a selected volume compensating for absorption of water in the coffee grounds in the brewing chamber 18 and for any steam losses. As seen in FIG. 5 the siphon tube 110 is attached to elbow 110a for quick disconnect as is drain tube 108 is in its connection to the tank cover 82 and the tank extension tube 108a.

As seen in FIG. 2 a right angle tube 120 is in liquid communication with solenoid water inlet valve 58 and extends upward to a fitting 122 having a needle valve 124. A heater inlet tube 126 (FIG. 4) extends from fitting 122 and delivers cold water to the inlet of hot water coil assembly 128 positioned in tank 74. The needle valve 124 controls the flow to the hot water coil assembly 76 in which the cold water is heated by the heater elements 70 and 72 (FIG. 6). The heated water is directed to exterior spigot 32 through delivery tube 130 connected to the outlet of hot water coil assembly 128 to provide exterior heated water for selected beverages. The delivery tube 130 is attached to components of the inlet of the spigot by a flare connector 130a having internal flare gasket (not shown) to permit removal with a single tool. The cold water inlet tube 126 is also attached to fitting 122 by a similar flare connector 130b capable of removal with a single tool.

As previously developed, a majority of the components of the electric circuit and water flow system are situated in an upper compartment formed by upper housing 4 which is easily accessible through removal of the top cover plate 10. As seen in FIG. 6, the cover plate 10 may be separated and removed from upper housing 4 to expose the entire top of coffee brewer 2 by removing the two threaded members 12, sliding end 10a away from ledge 13 and disconnecting pin connector 94. As seen in FIGS. 4 and 6, the basin 104 is mounted on a pair of parallel ledges 131 and a sloped base plate 131a affixed to upper housing 4 allowing for quick detachment upon removal of cover plate 10. When the basin 104 is removed, unimpeded access to the exterior switches 30a, 30b, and 30c, brewer button 31, ready indicator light 34 and the associated wiring is provided. Removal of basin 104 also exposes the tube 130 and the connection for spigot 32.

As seen in FIGS. 3, 4, 5, and 6a, the timer 62 is detachably mounted on bracket assembly 150 for quick disconnect from the coffee brewer 2 for repair or replacement. The bracket assembly 150 include a plate 152 having an offset central portion 154 to form an opening 156. An L-shaped member 158 suitably affixed to timer 62 is arranged to be inserted in opening 156 for mounting. A resilient spring clip 160, having an engagement portion 162 (FIG. 6a), is affixed to the side wall of upper housing 4 and acts to engage a horizontal slot 164 in the lower portion of L-shaped member 158 to lock the timer 62 in place (FIG. 6a). The timer 62 can be snapped in and out of its engaged position for service in conjunction with separation of quick disconnect connector 65 as most clearly seen in FIGS. 4, 5 and 6a.

As illustrated in FIGS. 4, 5, and 6 the tank cover 82 having hot water coil 62, heater elements 70 and 72, thermostat 84, and tube 108a mounted thereon is readily removable as a unit from tank 74 for service through removal of the top of upper housing 4. The tank cover 82 is retained on the cover 82 of tank 74 by a latch bar 160 having open slotted ends slots 161a, b at each end. The open slotted ends 161a, b are positioned adjacent partially raised upright threaded studs 162a, b provided in a closure panel 164 of the component compartment of lower housing 6.

A nut 163a engages stud 162a extending through the slot of slotted end 161a of the latch bar 160. A second nut 163b is attached to the stud 162b under which the opposite slotted end 161b of the latch bar 160 is arranged. The slot 161b is longer than slot 162a of the latch bar 160 to permit longitudinal movement for an extent to attain disengagement between slotted end 161a and the stud 162a. Then by moving the latch bar 160 in the opposite direction, disengagement between the stud 162b and slotted end 161b is achieved for removal.

The bar 160 is also affixed to the tank cover 82 by means of a pressure screw 166. By removal of screw 166 and loosening of nuts 163a, b, the latch bar may be removed by longitudinal movement as previously described and tank cover 82 and the elements mounted hereon (FIG. 6) can be lifted out of tank 72 in conjunction with release of mate and lock pin connector 91 connecting the wiring to the heaters 70, 72 and thermostat 84.

The solenoid housing 170 of solenoid water inlet valve 58 is separable from the control valve base 172 for repair or replacement as illustrated in FIGS. 2, 4, 5, and 6. The solenoid housing 170 is fitted with a pair of studs 174 having enlarged heads 176 and projecting from a side of solenoid housing 170. A bracket 178 having a pair of right angles to form a base 180, a connecting portion 182 and a retention plate section 184. The base is affixed to the side wall of upper housing 4 by a suitable securement technique as shown in FIG. 4. A pair of closed slots 186 having enlarged circular end portions 188 are formed in retention plate section 184. The enlarged circular end portions 188 of the slots 186 permit insertion of studs 174 of the solenoid housing 170. The studs 174 locked in operative position by being slid downward in slots 186 as illustration by arrows in FIG. 6. The solenoid housing 170 may be easily removed from position by disconnecting water inlet pipe 102 and pulling solenoid with the plunger 190 (FIG. 6) and housing 170 upward from valve fitting 196 for removal from the bracket 178. The cold water from water inlet 100 is shut off during removal of the solenoid housing 170 so that the coffee brewer 2 does not have to be disconnected from the water line for removal of the solenoid for repair. The upper position of the solenoid with its improved mounting greatly enhances the ease of maintenance of the solenoid as compared to the solenoids of the prior art having a lower and difficult to remove mounting.

Repair of the wiring of the electrical circuit 50 of coffee brewer 2 is also straight forward and simple. The harness design of the wiring pulls easily from the upper housing 4 and lower housing 6 and is easily pulled out after disconnection of the quick disconnect connectors and pin connector 91 and 94 to the line cord in the case of a defect.

What is claimed:
1. A beverage making apparatus comprising
housing means including an upper housing having an access opening and a lower housing, a cover member for enclosing said opening and forming a compartment in said upper housing, means for removably attaching said cover to said upper housing,
water heater means being positioned in said housing means,
water circulation means mounted in said housing means for receiving cold water and directing the cold water to said water heater means for heating,
said water circulation means further distributing hot water from said water heater means to a hot water discharge means,
electric circuit means being operatively coupled to said water heater means and said water circulation means, said electric circuit having a plurality of components,
said water circulation means and said electric circuit means each having operative components in said compartment, said operative components being accessible from outside of said housing means through said opening, and
said opening is provided on the top of said upper housing, quick disconnect means for permitting separate removal of said water heater means, said water circulation means and said plurality of components of said electric circuit means through said opening for repair.

2. The beverage making apparatus according to claim 1 wherein said water circulation means includes a solenoid valve means controlling the receipt of cold water to said hosing means, said solenoid valve means being removably mounted in said compartment in said upper housing, and said solenoid valve means being accessible for removal through said opening.

3. The beverage making apparatus according to claim 2 wherein said solenoid valve means is removable without interruption of the introduction of cold water to said housing means.

4. The apparatus according to claim 3 wherein said water circulation means includes tube means for distributing cold water to said water heater means and hot water form said water heater means to a hot water discharge means for making a beverage, said tube means being located in said compartment and accessible through said opening.

5. The apparatus according to claim 4 wherein said quick disconnect means includes a quick disconnect connector respectively coupling said tube means to said solenoid valve means, and said tube means to said water heater means and said tube means to said hot water discharge means.

6. The apparatus according to claim 3 wherein said water circulation means includes a timer operatively connected to said solenoid valve means, and said timer being mounted in said compartment for removal through said opening.

7. The apparatus according to claim 6 further comprising bracket means mounted on said upper housing within said compartment, said bracket means including resilient means for retaining said timer in said compartment.

8. The apparatus according to claim 1 further including bracket means for attaching said solenoid valve means to said upper housing, said bracket means having quick release means for detaching said solenoid valve means from said bracket means.

9. The apparatus according to claim 8 wherein said solenoid valve means is detached from said bracket means by being moved relative to said bracket means and released.

10. The apparatus according to claim 1 wherein said water circulation means includes a tank having an upper portion positioned in said compartment, said tank having a removable upper cover, said water heater being mounted on said cover and extending into said tank for heating the cold water, and said upper cover being removable through said upper access opening.

11. The apparatus according to claim 1 wherein said water circulation means includes a solenoid valve means for regulating the receipt of cold water, timer means for controlling the operation of said solenoid valve means, tube means for directing cold water to said heater means, said electric circuit means being connected to a source of electrical power and having a plurality of electrical leads being respectively connected to said solenoid valve means, said timer and said heater means, a plurality of quick disconnect connectors being arranged to connect said electrical leads respectively to said solenoid valve means, said timer means and said heater means.

12. The apparatus according to claim 11 further including a thermostat mounted on said cover for regulating said heater means.

13. A beverage making apparatus comprising
an upper housing and a lower housing having a base,
said upper housing having an upper opening, an access cover being removably affixed to said upper housing, removable attachment means for affixing said cover,
said upper housing forming a component compartment disposed beneath said opening,
water distribution means being positioned in a compartment for receiving cold water and directing said cold water to heating tank, said tank having heater means,
said water distribution means having a solenoid-valve means, a timer means operatively connected to said solenoid valve means, and thermostat means coupled to said heater means for regulating the temperature of said hot water, and
securement means for releasably mounting said solenoid valve means, said timer means, said heater means, and said thermostat means in said compartment for separate selective removal through said access opening.

14. The beverage making apparatus according to claim 13 further comprising electric circuit means being connected to a source of electrical potential, said electric circuit means having a plurality of electrical leads coupling said source of electrical potential to said solenoid valve means, said timer means, said heater means, and said thermostat means, and quick disconnect connecting said plurality of electrical leads to said solenoid valve means, said timer means, said heater means, and said thermostat for disconnecting said electric circuit during said removal.

15. The beverage making apparatus according to claim 14 wherein some of said plurality of leads are connected to said heater means and said thermostat means, a pin connector being operatively connected to said some of said plurality of leads to permit said heater means and said thermostat means to be removed.

* * * * *